US012683771B2

(12) United States Patent     (10) Patent No.: US 12,683,771 B2

Noce et al.     (45) Date of Patent: Jul. 14, 2026

(54) NON-REPUDIATION-FREE PUBLIC KEY AUTHENTICATION PROTOCOLS

(71) Applicant: ASSA ABLOY AB, Stockholm (SE)

(72) Inventors: Pasquale Noce, Naples (IT); Martin Kaufmann, Graz (AT)

(73) Assignee: ASSA ABLOY AB, Stockholm (SE)

( * ) Notice: Subject to any disclaimer, the term of this patent is extended or adjusted under 35 U.S.C. 154(b) by 143 days.

(21) Appl. No.: 18/467,905

(22) Filed: Sep. 15, 2023

(65) Prior Publication Data

US 2024/0113865 A1     Apr. 4, 2024

Related U.S. Application Data

(60) Provisional application No. 63/376,811, filed on Sep. 23, 2022.

(51) Int. Cl.
    *H04L 29/06*     (2006.01)
    *H04L 9/08*     (2006.01)
    *H04L 9/32*     (2006.01)

(52) U.S. Cl.
    CPC .......... *H04L 9/0825* (2013.01); *H04L 9/3247* (2013.01); *H04L 9/3263* (2013.01)

(58) Field of Classification Search
    CPC ... H04L 9/0825; H04L 9/3247; H04L 9/3263; H04L 9/088; H04L 9/3066; H04L 9/3268; H04L 9/0841
    See application file for complete search history.

(56) References Cited

U.S. PATENT DOCUMENTS

| | | | |
|---|---|---|---|
| 6,711,679 | B1 | 3/2004 | Guski et al. |
| 8,056,802 | B2 | 11/2011 | Gressel et al. |
| 8,299,890 | B2 | 10/2012 | Nagasawa |

(Continued)

FOREIGN PATENT DOCUMENTS

| | | |
|---|---|---|
| CN | 107978047 | 5/2018 |
| CN | 114241631 | 3/2022 |

(Continued)

OTHER PUBLICATIONS

U.S. Appl. No. 18/483,101, filed Oct. 9, 2023, Remote Access via System-Level Trusted Authorities.

(Continued)

*Primary Examiner* — Sher A Khan

(74) *Attorney, Agent, or Firm* — Schwegman Lundberg & Woessner, P.A.

(57) ABSTRACT

Methods and systems for securely communicating with an access control system are provided. The methods and systems establish, between first and second devices, a communication session based on a plurality of ephemeral keys. The methods and systems compute, by the first device, a shared session key as a function of a second public key of the second device and a sum of a first private key of the first device and a first ephemeral key of the plurality of ephemeral keys; and compute, by the second device, the shared session key as a function of a second private key of the second device and a sum of a first public key of the first device and a second ephemeral key of the plurality of ephemeral keys. The methods and systems exchange one or more messages securely between the first device and the second device using the shared session key.

20 Claims, 5 Drawing Sheets

(56) References Cited

U.S. PATENT DOCUMENTS

| | | | |
|---|---|---|---|
| 8,499,154 | B2 | 7/2013 | Huntzicker et al. |
| 8,646,034 | B2 | 2/2014 | Murakami et al. |
| 9,230,375 | B2 * | 1/2016 | Micali ..................... G07C 9/22 |
| 9,332,002 | B1 | 5/2016 | Bowen |
| 9,391,782 | B1 | 7/2016 | Mironenko |
| 10,169,587 | B1 * | 1/2019 | Nix ........................... H04L 9/14 |
| 10,462,114 | B2 * | 10/2019 | Poffenbarger ........ H04L 9/3234 |
| 10,511,591 | B2 | 12/2019 | Campagna et al. |
| 10,708,072 | B2 | 7/2020 | Le Saint |
| 10,819,526 | B2 | 10/2020 | Singhal et al. |
| 10,855,440 | B1 * | 12/2020 | Alwen .................. H04L 9/0894 |
| 11,303,449 | B2 | 4/2022 | Peddada |
| 11,546,142 | B1 * | 1/2023 | Sinchev ................ G06F 12/145 |
| 11,962,579 | B2 | 4/2024 | Allamsetty et al. |
| 11,966,460 | B2 | 4/2024 | Balakrishnan et al. |
| 2001/0055388 | A1 | 12/2001 | Kaliski |
| 2003/0061512 | A1 | 3/2003 | Flurry et al. |
| 2004/0049675 | A1 | 3/2004 | Micali et al. |
| 2004/0093493 | A1 | 5/2004 | Bisbee et al. |
| 2006/0179319 | A1 | 8/2006 | Krawczyk |
| 2009/0313684 | A1 | 12/2009 | Shah et al. |
| 2010/0205443 | A1 | 8/2010 | Zhao et al. |
| 2011/0004753 | A1 | 1/2011 | Gomi et al. |
| 2011/0248852 | A1 | 10/2011 | Falk et al. |
| 2012/0330769 | A1 | 12/2012 | Arceo |
| 2013/0136255 | A1 * | 5/2013 | Brown .................. H04L 9/0869 380/28 |
| 2014/0211938 | A1 * | 7/2014 | Campagna ........... H04L 9/3252 380/44 |
| 2015/0104017 | A1 * | 4/2015 | Halford ............... H04W 12/041 380/270 |
| 2015/0229473 | A1 | 8/2015 | Klein et al. |
| 2015/0372811 | A1 * | 12/2015 | Le Saint ............... H04L 63/068 705/76 |
| 2016/0099814 | A1 | 4/2016 | Negi et al. |
| 2017/0201383 | A1 | 7/2017 | Kim |
| 2017/0228953 | A1 | 8/2017 | Lupovici |
| 2018/0351941 | A1 * | 12/2018 | Chhabra ................. H04L 63/08 |
| 2018/0375663 | A1 | 12/2018 | Le Saint et al. |
| 2019/0089532 | A1 | 3/2019 | Lambert |
| 2019/0354971 | A1 * | 11/2019 | Ettensohn .......... G06Q 20/3829 |
| 2019/0372764 | A1 | 12/2019 | Fay |
| 2019/0394042 | A1 | 12/2019 | Peddada |
| 2020/0007327 | A1 | 1/2020 | Garg et al. |
| 2020/0021588 | A1 * | 1/2020 | Wittrock .................. G07C 9/22 |
| 2020/0186326 | A1 | 6/2020 | Chalker |
| 2020/0186367 | A1 | 6/2020 | Yang et al. |
| 2020/0213111 | A1 * | 7/2020 | Leavy ................... H04L 9/3242 |
| 2020/0336470 | A1 | 10/2020 | Kravitz et al. |
| 2020/0344052 | A1 | 10/2020 | Fay |
| 2021/0092603 | A1 | 3/2021 | Yang et al. |
| 2021/0153010 | A1 | 5/2021 | Torvinen et al. |
| 2021/0226803 | A1 | 7/2021 | Traynor et al. |
| 2022/0006620 | A1 * | 1/2022 | Bursell ................. H04L 9/0825 |
| 2022/0029969 | A1 | 1/2022 | Kravitz et al. |
| 2022/0158994 | A1 | 5/2022 | Kamal et al. |
| 2022/0207938 | A1 | 6/2022 | Chun et al. |
| 2022/0272534 | A1 | 8/2022 | Torvinen et al. |
| 2022/0311751 | A1 * | 9/2022 | Li ........................... H04L 67/12 |
| 2022/0392286 | A1 | 12/2022 | Elrad et al. |
| 2024/0106634 | A1 * | 3/2024 | Noce ..................... H04L 9/3268 |
| 2024/0106662 | A1 | 3/2024 | Noce |
| 2024/0129138 | A1 | 4/2024 | Noce et al. |

FOREIGN PATENT DOCUMENTS

| | | | | | |
|---|---|---|---|---|---|
| CN | 111343613 | B | * | 6/2024 | ........... H04L 9/3242 |
| EP | 2363976 | | | 9/2011 | |
| EP | 2363976 | A1 | * | 9/2011 | ........... H04L 9/3252 |
| EP | 2493112 | | | 8/2012 | |
| EP | 3694141 | A1 | * | 8/2020 | ......... H04W 12/041 |
| JP | 2023135947 | A | * | 9/2023 | ........... H04L 9/3073 |

| | | | | |
|---|---|---|---|---|
| WO | WO-2013021360 | A1 | * 2/2013 | ........... H04L 9/3013 |
| WO | WO-2018208546 | A1 | * 11/2018 | ........... H04L 9/0844 |
| WO | 2022000023 | | 1/2022 | |

OTHER PUBLICATIONS

U.S. Appl. No. 18/468,131, filed Sep. 15, 2023, User Credentials Protecting From Swapping Attacks.

U.S. Appl. No. 18/468,167, filed Sep. 15, 2023, Privacy-Strengthened Public Key Authentication Protocols.

"European Application Serial No. 23198928.6, Extended European Search Report mailed Feb. 12, 2024", 8 pgs.

"European Application Serial No. 23203049.4, Response Filed Mar. 22, 2024 to Extended European Search Report mailed Mar. 11, 2024", 2 pages.

"European Application Serial No. 23198910.4, Extended European Search Report mailed Nov. 13, 2023", 7 pgs.

"European Application Serial No. 23198922.9, Extended European Search Report mailed Feb. 6, 2024", 8 pgs.

"European Application Serial No. 23203049.4, Extended European Search Report mailed Mar. 11, 2024", 7 pgs.

"U.S. Appl. No. 18/483,101, Final Office Action mailed Oct. 1, 2025", 12 pgs.

"European Application Serial No. 23203049.4, Communication Pursuant to Article 94(3) EPC mailed Sep. 10, 2025", 4 pgs.

"European Application Serial No. 23198922.9, Response Filed Jul. 31, 2024 to Extended European Search Report mailed Feb. 6, 2024", 81 pgs.

"European Application Serial No. 23198928.6, Response Filed Jul. 31, 2024 to Extended European Search Report mailed Feb. 12, 2024", 83 pgs.

"European Application Serial No. 23198910.4, Response Filed Aug. 1, 2024 Extended European Search Report mailed Nov. 13, 2023", 11 pgs.

"European Application Serial No. 23198910.4, Communication Pursuant to Article 94(3) EPC mailed Apr. 11, 2025", 4 pgs.

"European Application Serial No. 23198910.4, Communication Pursuant to Article 94(3) EPC mailed Feb. 20, 2025", 4 pgs.

"European Application Serial No. 23198910.4, Response filed Mar. 25, 2025 to Communication Pursuant to Article 94(3) EPC mailed Feb. 20, 2025", 13 pgs.

"U.S. Appl. No. 18/483,101, Non Final Office Action mailed May 7, 2025", 10 pages.

"European Application Serial No. 23198910.4, Response filed Jul. 21, 2025 to Communication Pursuant to Article 94(3) EPC mailed Apr. 11, 2025", 13 pages.

"U.S. Appl. No. 18/483,101, Response filed Jul. 23, 2025 to Non Final Office Action mailed May 7, 2025", 9 pages.

"U.S. Appl. No. 18/468,167, Non Final Office Action mailed Jul. 30, 2025", 19 pages.

"U.S. Appl. No. 18/468,131, Non Final Office Action mailed Dec. 23, 2025", 22 pgs.

"U.S. Appl. No. 18/468,167, Final Office Action mailed Dec. 8, 2025", 19 pgs.

"U.S. Appl. No. 18/468,167, Response filed Jan. 23, 2026 to Final Office Action mailed Dec. 8, 2025", 9 pgs.

"U.S. Appl. No. 18/483,101, Notice of Allowance mailed Nov. 20, 2025", 8 pgs.

"Google Translation of CN 114241631", Xinhuasan Intelligent Terminal Co, (2021), 1-16.

"U.S. Appl. No. 18/468,167, Advisory Action mailed Feb. 10, 2026", 3 pgs.

"U.S. Appl. No. 18/468,131, Response filed Mar. 5, 2026 to Non Final Office Action mailed Dec. 23, 2025", 8 pgs.

"U.S. Appl. No. 18/468,167, Non Final Office Action mailed Mar. 11, 2026", 19 pgs.

"U.S. Appl. No. 18/468,131, Final Office Action mailed Mar. 19, 2026", 23 pgs.

* cited by examiner

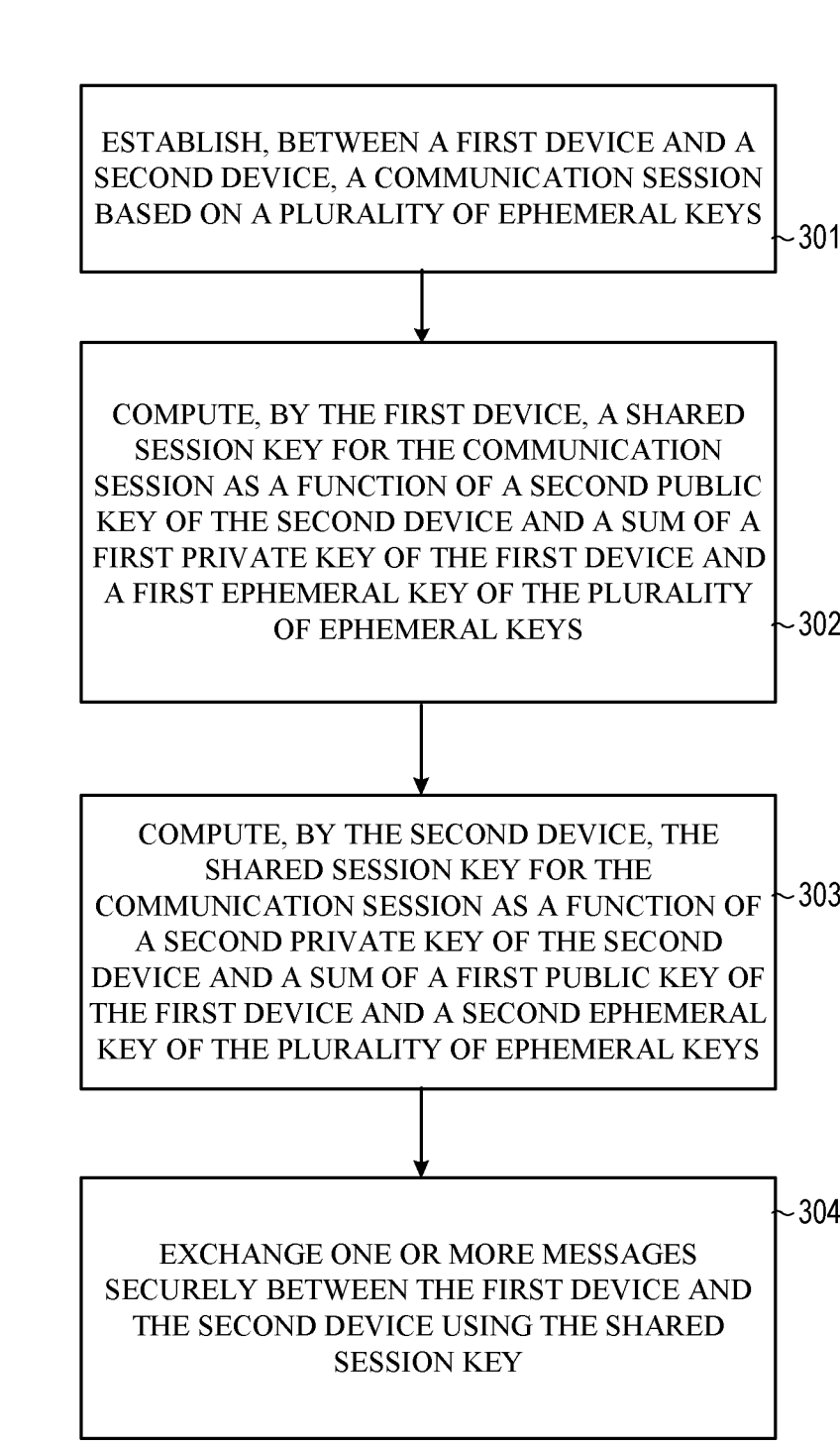

300

ESTABLISH, BETWEEN A FIRST DEVICE AND A SECOND DEVICE, A COMMUNICATION SESSION BASED ON A PLURALITY OF EPHEMERAL KEYS ~301

COMPUTE, BY THE FIRST DEVICE, A SHARED SESSION KEY FOR THE COMMUNICATION SESSION AS A FUNCTION OF A SECOND PUBLIC KEY OF THE SECOND DEVICE AND A SUM OF A FIRST PRIVATE KEY OF THE FIRST DEVICE AND A FIRST EPHEMERAL KEY OF THE PLURALITY OF EPHEMERAL KEYS ~302

COMPUTE, BY THE SECOND DEVICE, THE SHARED SESSION KEY FOR THE COMMUNICATION SESSION AS A FUNCTION OF A SECOND PRIVATE KEY OF THE SECOND DEVICE AND A SUM OF A FIRST PUBLIC KEY OF THE FIRST DEVICE AND A SECOND EPHEMERAL KEY OF THE PLURALITY OF EPHEMERAL KEYS ~303

EXCHANGE ONE OR MORE MESSAGES SECURELY BETWEEN THE FIRST DEVICE AND THE SECOND DEVICE USING THE SHARED SESSION KEY ~304

FIG. 3

API CALLS                                                                MESSAGES

NON-REPUDIATION-FREE PUBLIC KEY AUTHENTICATION PROTOCOLS

CROSS-REFERENCE TO RELATED APPLICATION

This application is a non-provisional application of and claims priority to U.S. Provisional Application No. 63/376,811, filed Sep. 23, 2022, which is incorporated by reference herein in its entirety.

BACKGROUND

Access control readers are widely used in various settings to control access to restricted areas. These readers are typically connected to a server that manages access control policies and configurations. In order to securely communicate with such readers, user devices employ various encryption protocols.

SUMMARY

In some aspects, the techniques described herein relate to a method including: establishing, between a first device and a second device, a communication session based on a plurality of ephemeral keys; computing, by the first device, a shared session key for the communication session as a function of a second public key of the second device and a sum of a first private key of the first device and a first ephemeral key of the plurality of ephemeral keys; computing, by the second device, the shared session key for the communication session as a function of a second private key of the second device and a sum of a first public key of the first device and a second ephemeral key of the plurality of ephemeral keys; and exchanging one or more messages securely between the first device and the second device using the shared session key.

In some aspects, the techniques described herein relate to a method, wherein the first device includes an access control reader, and wherein the second device includes a user device.

In some aspects, the techniques described herein relate to a method, wherein the one or more messages include a credential for accessing a protected asset associated with the access control reader.

In some aspects, the techniques described herein relate to a method, wherein establishing the communication session includes performing Diffie-Hellman key exchange to exchange the first and second public keys.

In some aspects, the techniques described herein relate to a method, further including: generating, by the first device, a first ephemeral key pair of the plurality of ephemeral keys, the first ephemeral key pair including a first public ephemeral key and a first private ephemeral key; and generating, by the second device, a second ephemeral key pair of the plurality of ephemeral keys, the second ephemeral key pair including a second public ephemeral key and a second private ephemeral key.

In some aspects, the techniques described herein relate to a method, wherein the first ephemeral key includes the first private ephemeral key, and wherein the second ephemeral key includes the first public ephemeral key.

In some aspects, the techniques described herein relate to a method, wherein the first and second ephemeral keys correspond to a pair of private and public ephemeral keys of the first device.

In some aspects, the techniques described herein relate to a method, further including: generating a digital signature using the first and second public keys (e.g., the public keys of the first and second devices) and the first private key. In some cases, the first device's static private key used to generate the digital signature may, but need not match the first device static private key used to compute the shared session key (the shared secret). For example, the first device certificate that may be exchanged may include two distinct static public keys, one to be used for signature verification and the other one for the computation of shared session key.

In some aspects, the techniques described herein relate to a method, wherein the digital signature is generated based on a certificate of the first device or an identifier of the first device, the second device authenticating the first device based on the digital signature.

In some aspects, the techniques described herein relate to a method, further including: generating an authentication message by the second device using the shared session key.

In some aspects, the techniques described herein relate to a method, wherein the shared session key, computed by the first and second devices, is of a same value.

In some aspects, the techniques described herein relate to a method, wherein the first device computes the shared session key by: multiplying the second public key of the second device by the sum of the first private key and the first ephemeral key.

In some aspects, the techniques described herein relate to a method, wherein the second device computes the shared session key by: multiplying the second private key by the sum of the first public key and the second ephemeral key.

In some aspects, the techniques described herein relate to a method, further including: deriving a further shared session key based on one or more of the plurality of ephemeral keys and the first public key or the second public key.

In some aspects, the techniques described herein relate to a method, wherein the second device generates an authentication message for transmission to the first device based on the further shared session key.

In some aspects, the techniques described herein relate to a method, wherein the plurality of ephemeral keys are stored on a remote server.

In some aspects, the techniques described herein relate to a system including: one or more processors coupled to a memory including non-transitory computer instructions that, when executed by the one or more processors, cause the one or more processors to perform operations including: establishing, between a first device and a second device, a communication session based on a plurality of ephemeral keys; computing, by the first device, a shared session key for the communication session as a function of a second public key of the second device and a sum of a first private key of the first device and a first ephemeral key of the plurality of ephemeral keys; computing, by the second device, the shared session key for the communication session as a function of a second private key of the second device and a sum of a first public key of the first device and a second ephemeral key of the plurality of ephemeral keys; and exchanging one or more messages securely between the first device and the second device using the shared session key.

In some aspects, the techniques described herein relate to a non-transitory computer readable medium including non-transitory computer-readable instructions that, when executed by one or more processors, configure the one or more processors to perform operations including: establishing, between a first device and a second device, a communication session based on a plurality of ephemeral keys;

3 computing, by the first device, a shared session key for the communication session as a function of a second public key of the second device and a sum of a first private key of the first device and a first ephemeral key of the plurality of ephemeral keys; computing, by the second device, the shared session key for the communication session as a function of a second private key of the second device and a sum of a first public key of the first device and a second ephemeral key of the plurality of ephemeral keys; and exchanging one or more messages securely between the first device and the second device using the shared session key.

In some aspects, the techniques described herein relate to a non-transitory computer readable medium, wherein the first device includes an access control reader, and wherein the second device includes a user device.

In some aspects, the techniques described herein relate to a non-transitory computer readable medium, wherein the one or more messages include a credential for accessing a protected asset associated with the access control reader.

BRIEF DESCRIPTION OF THE DRAWINGS

FIG. 3 is a flowchart illustrating example operations of the access control system, according to some examples.

DETAILED DESCRIPTION

Figure 1:
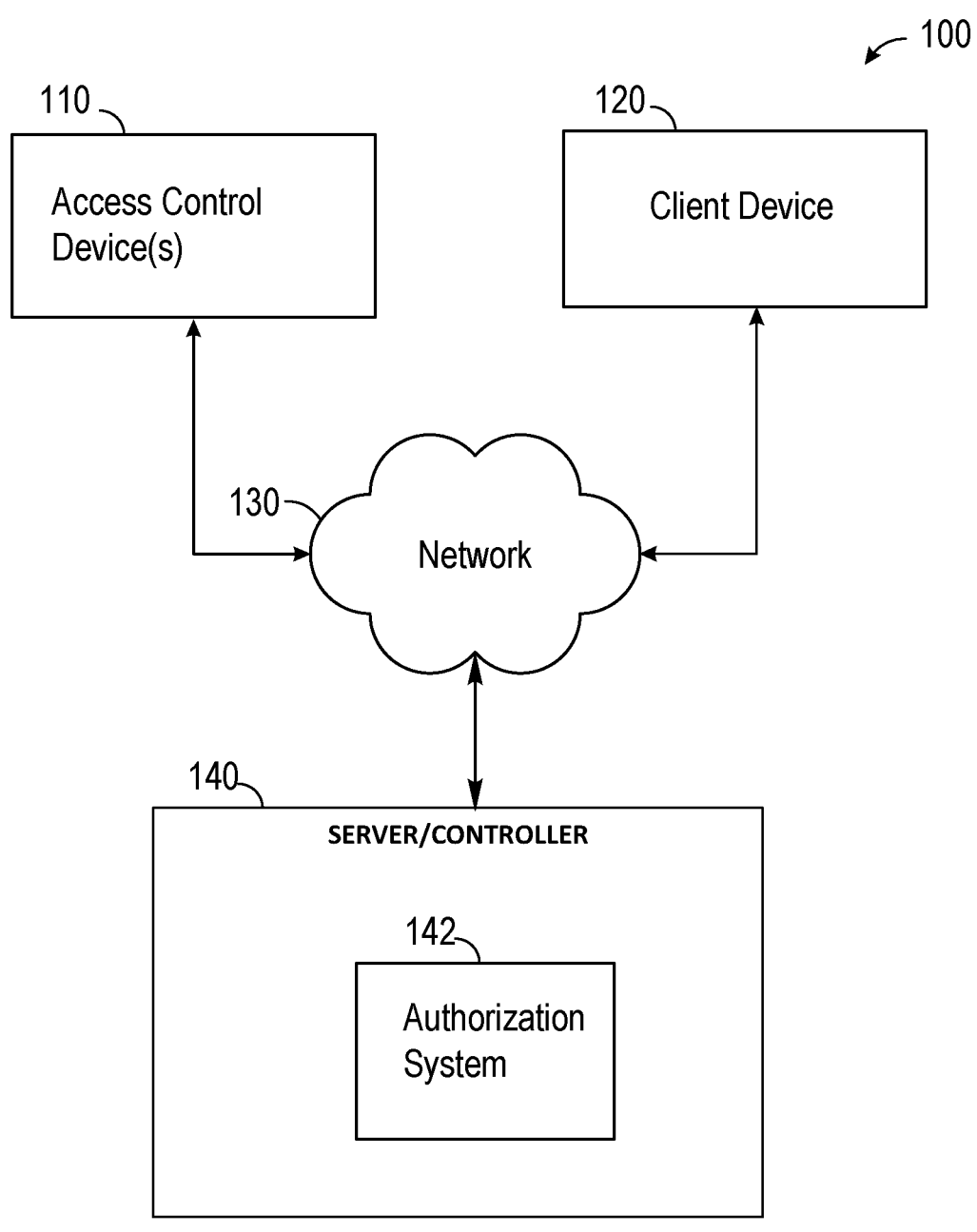
FIG. 1 is a block diagram of an example access control system, according to some examples.

Example methods and systems for performing non-repudiation-free public key authentication are described. In the following description, for purposes of explanation, numerous specific details are set forth in order to provide a thorough understanding of the examples. It will be evident, however, to one of ordinary skill in the art that examples of the disclosure may be practiced without these specific details.

Public key authentication protocols can protect either party from key compromise impersonation attacks by requiring the other party to generate a digital signature, but this may expose the other party to non-repudiation issues. An example where non-repudiation may be an issue is that of an access protocol where the user device generates a signature to authenticate itself. This signature also provides a non-repudiable proof that the user associated with that User Device has had access to the system. Such non-repudiation may be undesirable in some use cases (e.g., in those where user's privacy is a strong concern). Computing this signature also involves various vector/scalar multiplication operations which consume a great deal of time and resources. This can increase battery drain and slow down the overall system, which is inefficient and undesirable. As an alternative to signature generation, a Menezes-Qu-Vanstone (MQV) key exchange can be used, but this approach introduces the generation of an implicit signature, whose compromise enables impersonation of the involved party across distinct sessions.

The present disclosure provides a security mechanism to protect both parties from key compromise impersonation attacks without giving rise to a non-repudiation issue for the second party to authenticate itself, as well as without providing for any secret enabling impersonation of either party across distinct sessions, other than that party's static private key. Also, the disclosed techniques provide the added security and benefits of using signatures without having to expend the time and resources needed to generate such signatures.

Specifically, the disclosed examples provide an intelligent solution, which can operate and communicate with the access control system quickly, securely, and efficiently. In this way, communication with the access control readers can be performed quickly and efficiently, which improves the overall functioning of the system. The disclosed examples establish, between first and second devices, a communication session based on a plurality of ephemeral keys. The disclosed examples compute, by the first device, a shared session key as a function of a second public key of the second device and a sum of a first private key of the first device and a first ephemeral key of the plurality of ephemeral keys; and compute, by the second device, the shared session key as a function of a second private key of the second device and a sum of a first public key of the first device and a second ephemeral key of the plurality of ephemeral keys. The disclosed examples exchange one or more messages securely between the first device and the second device using the shared session key.

As referred to herein, the "addition" of two group elements includes or stands for the application of the binary operation of the cryptographic group being used (e.g., modular integer multiplication for an integer finite field, addition of elliptic curve points for an elliptic curve group). Also, the "multiplication" of a group element by an integer includes or stands for the scalar multiplication provided for by the cryptographic group being used (e.g., modular integer exponentiation for an integer finite field, scalar multiplication of an elliptic curve point for an elliptic curve group).

FIG. 1 is a block diagram showing an example system 100, according to various examples. The system 100 can be an access control system that includes a client device 120, one or more access control devices 110 that control access to a protected asset or secure resource, such as through a lockable door, and a server/controller 140 that are communicatively coupled over a network 130 (e.g., LAN, WAN such as the Internet, WiFi, BLE, ultra-wideband (UWB) communication protocol, telephony network, or other wired or wireless communication protocols).

The client device 120 and the access control devices 110 can be communicatively coupled via electronic messages (e.g., packets exchanged over the Internet, BLE, UWB, WiFi Direct, NFC, or any other protocol). While FIG. 1 illustrates a single access control device 110 and a single client device 120, it is understood that a plurality of access control devices 110 and a plurality of client devices 120 can be included in the system 100 in other examples. As used herein, the term "client device" may refer to any machine that interfaces to a communications network (such as network 130) to exchange credentials with an access control device 110, the server/controller 140, another client device 120, or any other component to obtain access to the asset or resource protected by the access control device 110. In some examples, the client device 120 can additionally or alternatively communicate directly with, e.g., an access control device or another client device 120.

In some cases, some or all of the components and functionality of the server/controller 140 can be included in the client device 120 and/or the access control device 110. A client device 120 may be, but is not limited to, a mobile phone, desktop computer, laptop, portable digital assistant (PDA), smart phone, a wearable device (e.g., a smart watch), tablet, ultrabook, netbook, laptop, multi-processor system, microprocessor-based or programmable consumer electronics, or any other communication device that a user may use to access a network.

The access control device 110 can include an access reader device (also referred to as an access control reader) connected to a secure/protected resource (e.g., a door locking mechanism or backend server) that controls the secure/protected resource (e.g., door locking mechanism). The resource associated with the access control device 110 can include a door lock, an ignition system for a vehicle, or any other device that grants or denies access to a physical component or that can be operated to grant or deny access to the physical component. For example, in the case of a door lock, the access control device 110 can deny access, in which case the door lock remains locked and the door cannot be opened; or can grant access, in which case the door lock becomes unlocked to allow the door to be opened. As another example, in the case of an ignition system, the access control device 110 can deny access, in which case the vehicle ignition system remains disabled and the vehicle cannot be started; or can grant access, in which case the vehicle ignition becomes enabled to allow the vehicle to be started.

Physical access control covers a range of systems and methods to govern access, for example, by people, to secure areas or secure assets. Physical access control includes identification of authorized users or devices (e.g., vehicles, drones, etc.) and actuation of a gate, door, or other facility used to secure an area or actuation of a control mechanism, e.g., a physical or electronic/software control mechanism, permitting access to a secure asset. The access control device 110 forms part of a physical access control system (PACS), which can include a reader (e.g., an online or offline reader) that may hold authorization data (also referred to as access control information) and can be capable of determining whether credentials (e.g., from credential or key devices such as radio frequency identification (RFID) chips in cards, fobs, or personal electronic devices such as mobile phones) are authorized for an actuator or control mechanism (e.g., door lock, door opener, software control mechanism, turning off an alarm, etc.), or a PACS can include a host server to which readers and actuators are connected (e.g., via a controller) in a centrally managed configuration.

In centrally managed configurations, readers can obtain credentials from credential or key devices and pass those credentials to the PACS host server or headend system. The readers can send the credentials over a wired or wireless link. The host server then determines whether the credentials authorize access to the secure area or secure asset and commands the actuator or other control mechanism accordingly by sending an allow/deny message back to the reader over the wired or wireless link. While examples in physical access control are used herein, the disclosure applies equally to logical access control system (LACS) use cases (e.g., logical access to personal electronic devices, rider identification in transport services, access and asset control in unmanned stores, etc.).

In general, the access control device 110 can include one or more of a memory, a processor, one or more antennas, a communication module, a network interface device, a user interface, and a power source or supply. The memory of the access control device 110 can be used in connection with the execution of application programming or instructions by the processor of the access control device 110, and for the temporary or long-term storage of program instructions or instruction sets and/or credential or authorization data, such as credential data, credential authorization data, or access control data or instructions. For example, the memory can contain executable instructions that are used by the processor to run other components of access control device 110 and/or to make access determinations based on credential or authorization data. The memory of the access control device 110 can comprise a computer readable medium that can be any medium that can contain, store, communicate, or transport data, program code, or instructions for use by or in connection with access control device 110. The computer readable medium can be, for example, but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device in general, a compact disc read-only memory (CD-ROM), or other optical or magnetic storage device. Computer-readable media includes, but is not to be confused with, a computer-readable storage medium, which is intended to cover all physical, non-transitory, or similar examples of computer-readable media.

The processor of the access control device 110 can correspond to one or more computer processing devices or resources. For instance, the processor can be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor can be provided as a microprocessor, Central Processing Unit (CPU), or plurality of microprocessors or CPUs that are configured to execute instructions sets stored in an internal memory and/or memory of the access control device 110.

The antenna of the access control device 110 can correspond to one or multiple antennas and can be configured to provide for wireless communications between access control device 110 and a credential or key device (e.g., client device 120). The antenna can be arranged to operate using one or more wireless communication protocols and operating frequencies including, but not limited to, the IEEE 802.15.1, Bluetooth, BLE, NFC, ZigBee, Global System for Mobile communications (GSM), Code Division Multiple Access (CDMA), Wi-Fi, RF, UWB, and the like. By way of example, the antenna(s) can be RF antenna(s), and as such, may transmit/receive RF signals through free-space to be received/transferred by a credential or key device having an RF transceiver.

A communication module of the access control device 110 can be configured to communicate according to any suitable communications protocol with one or more different systems or devices either remote or local to access control device 110, such as one or more client devices 120 and/or server/controller 140. In some cases, the communication module of the access control device 110 is configured to perform the disclosed authentication protocol securely. Namely, the communication module can be implemented as part of the access control device 110 and/or the client device 120 to perform the non-repudiation-free public key authentication protocol, discussed in connection with FIG. 2. Specifically, the communication module of the access control device 110 can generate a shared secret key that is the same as the shared secret key generated by the communication module of the client device 120. The shared secret key (also referred to as Z2) can be used to encrypt data exchanged between the access control device 110 and the client device 120 including data containing credentials associated with the client device 120 that are used to access a protected resource (e.g., protected by the access control device 110). The shared secret key can be generated without the client device 120 and/or the access control device 110 generating a signature that may represent or include private information.

In some cases, the communication module uses a same wired or wireless link between the access control device 110 and the controller 140 for all the communication modes. In some cases, the communication module uses one wired or wireless link between the access control device 110 and the controller 140 to communicate access control information and uses a different wired or wireless link to communicate or receive configuration information updates from the controller 140 over the IP communication mode.

The network interface device of the access control device 110 includes hardware to facilitate communications with other devices, such as a one or more client devices 120 and/or server/controller 140 (e.g., a PACS server), over a communication network, such as network 130, utilizing any one of a number of transfer protocols (e.g., frame relay, IP, transmission control protocol (TCP), user datagram protocol (UDP), hypertext transfer protocol (HTTP), etc.). Example communication networks can include a LAN, a WAN, a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device can include an Ethernet port or other physical jack, a Wi-Fi card, a Network Interface Card (NIC), a cellular interface (e.g., antenna, filters, and associated circuitry), or the like. In some examples, network interface device can include a plurality of antennas to wirelessly communicate using at least one of single-input multiple-output (SIMO), multiple-input multiple-output (MIMO), or multiple-input single-output (MISO) techniques.

A user interface of the access control device 110 can include one or more input devices and/or display devices. Examples of suitable user input devices that can be included in the user interface include, without limitation, one or more buttons, a keyboard, a mouse, a touch-sensitive surface, a stylus, a camera, a microphone, etc. Examples of suitable user output devices that can be included in the user interface include, without limitation, one or more LEDs, an LCD panel, a display screen, a touchscreen, one or more lights, a speaker, and so forth. It should be appreciated that the user interface can also include a combined user input and user output device, such as a touch-sensitive display or the like.

The network 130 may include, or operate in conjunction with, an ad hoc network, an intranet, an extranet, a virtual private network (VPN), a LAN, a wireless network, a wireless LAN (WLAN), a WAN, a wireless WAN (WWAN), a metropolitan area network (MAN), BLE, UWB, the Internet, a portion of the Internet, a portion of the Public Switched Telephone Network (PSTN), a POTS network, a cellular telephone network, a wireless network, a Wi-Fi® network, another type of network, or a combination of two or more such networks. For example, a network or a portion of a network may include a wireless or cellular network and the coupling may be a CDMA connection, a GSM connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other short range or long range protocols, or other data transfer technology.

In an example, as the client device 120 approaches the access control device 110 (e.g., comes within range of a BLE communication protocol), the client device 120 transmits credentials of the client device 120 over the network 130, such as using the shared secret key. In some cases, the credentials can be selected from a plurality of credentials based on a current geographical location of the client device 120. For example, multiple credentials each associated with a different geographical location can be stored on the client device 120. When the client device 120 comes within a certain distance of a geographical location associated with one of the credentials (e.g., within 10 meters), the client device 120 retrieves the associated credentials from local memory.

In one example, the client device 120 provides the credentials directly to the access control device 110. In such cases, the access control device 110 communicates the credentials with the server/controller 140. The server/controller 140 in FIG. 1 includes an authorization system 142. The server/controller 140, client device 120, and/or the access control device 110 can further include elements described with respect to FIGS. 4 and 5, such as a processor and memory, having instructions stored thereon, that when executed by the processor, cause the processor to control the functions of the server/controller 140, client device 120, and/or the access control device 110.

The server/controller 140 searches a list of credentials stored in the authorization system 142 to determine whether the received credentials match credentials from the list of authorized credentials for accessing a secure asset or resource (e.g., door or secure area) protected by the access control device 110. In response to determining that the received credentials are authorized to access the access control device 110, the server/controller 140 instructs the access control device 110 to perform an operation granting access for the client device 120 (e.g., instructing the access control device 110 to unlock a lock of a door). In another example, the client device 120 provides the credentials to the server/controller 140, such as using the shared secret key.

The server/controller 140 searches a list of credentials stored in the authorization system 142 to determine whether the received credentials match credentials from the list of authorized credentials for accessing a secure asset or resource (e.g., door or secure area) protected by the access control device 110. In response to determining that the received credentials are authorized to access the access control device 110, the server/controller 140 instructs the access control device 110 (associated with the received credentials and within a geographical distance of the client device 120) to perform an operation granting access to the client device 120 (e.g., instructing the access control device 110 to unlock a lock of a door).

In some examples, the client device 120 and the access control device 110 can initially establish an unsecure communication channel. Over this unsecure communication channel (e.g., prior to the client device 120 and the access control device 110 authenticating each other), the client device 120 and the access control device 110 can perform a Diffie-Hellman key exchange or other protocol to allow the devices to exchange and/or establish ephemeral keys. These ephemeral keys are later used to exchange static public keys of the client device 120 and the access control device 110 that are permanent keys that the devices use to communicate securely and encrypt messages sent to other devices. These static public keys generally remain unchanged across sessions.

The access control device 110 can generate a first pair of ephemeral keys (e.g., including a private ephemeral key and a public ephemeral key). The access control device 110 communicates the public ephemeral key of the first pair of keys to the client device 120. Based on the public ephemeral key, the client device 120 can generate a second pair of ephemeral keys (e.g., including a private ephemeral key and a public ephemeral key). As referred to herein, ephemeral keys represent keys that are session specific and that expire and are no longer usable after some condition is satisfied (e.g., after a threshold period of time elapses and/or after the keys are used a threshold quantity of times). The client device 120 can transmit the public ephemeral key of the second pair of ephemeral keys to the access control device 110.

After the access control device 110 and the client device 120 exchange their public ephemeral keys (and/or their respective public static keys), the access control device 110 can generate a digital signature based on the public ephemeral keys that were exchanged using the static private key of the access control device 110. The digital signature can also include a certificate and/or other identifier of the access control device 110. The access control device 110 can send a message to the client device 120 including the generated digital signature. The client device 120 can decrypt the generated signature using the ephemeral keys. The client device 120 can then communicate with the controller 140 to authenticate the certificate, signature, and/or identifier of the access control device 110. Once the client device 120 authenticates the access control device 110, the client device 120 can transmit a message to the access control device 110 including the public static key of the client device 120. The message can optionally include other authentication information, such as an authentication code, a certificate, an identifier of the client device 120, and/or a credential. The access control device 110 can decrypt the message and authenticate the client device 120 based on the authentication information, such as an authentication code, a certificate, an identifier of the client device 120, and/or a credential included in the message.

In some examples, after the client device 120 and the access control device 110 establish the set of ephemeral keys and exchange their respective static public keys, the client device 120 and the access control device 110 compute and/or establish a shared secret key or shared session key. In some cases, the access control device 110 computes the shared secret key by multiplying the static public key of the client device 120 by the sum of the static private key of the access control device 110 and the private ephemeral key of the access control device 110 (e.g., modulo n, where n is the group order (which is a modular addition of two integers)).

The private/public ephemeral key and ephemeral private/public key are used interchangeably and should be understood to mean the same thing. Private/public static key and static private/public key are used interchangeably and should be understood to mean the same thing. The client device 120 computes the shared secret key by multiplying the group element resulting from the addition of the static public key of the access control device 110 and ephemeral public key of the access control device 110 by the static private key of the client device 120. In this way, the client device 120 and the access control device 110 arrive at the same shared session key value using dependent calculations.

The client device 120 and the access control device 110 can perform further communications and exchange data by encrypting the data using the shared session key. For example, the client device 120 can send a credential for accessing a protected asset or resource to the access control device 110 using the shared session key. In some examples, the client device 120 can authenticate itself by authenticating a message (possibly including the certificate, the bare public key, or another stable identifier of the client device 120) using a further shared session key derived from the shared secret $Z0\|Z1$, where $Z1$ is the shared secret resulting from the Diffie-Hellman key exchange performed using the static key pairs of the two involved parties.

In accordance with these encryption techniques, besides preventing non-repudiation issues for the second party to authenticate itself, the enforcement of the proposed security mechanism provides the additional benefits including perfect forward secrecy being enforced. Indeed, even a compromise of both parties' static private keys is not sufficient to compute $Z0$ (e.g., the ephemeral keys), which can only be computed by knowing either party's ephemeral private key. Also, key compromise impersonation resilience is enforced. Indeed, a compromise of the static private key of the first party to authenticate itself is not sufficient to compute $Z2$ (e.g., the shared session key), which can only be computed by also knowing the first party's ephemeral private key. As compared to the MQV primitive, according to the disclosed examples, there is no single secret like MQV implicit signatures whose compromise enables impersonation of either party across distinct sessions, other than that party's static private key. Particularly, knowing the sum modulo n of the static and ephemeral private keys of the first party to authenticate itself is not sufficient to impersonate it, as the first party's static private key would also generally need to be known to compute its signature. Also, if elliptic curve cryptography is used both for key exchanges and for signature generation, the removal of the requirement for a signature improves performance more than that of an ECDH key exchange.

Figure 2:
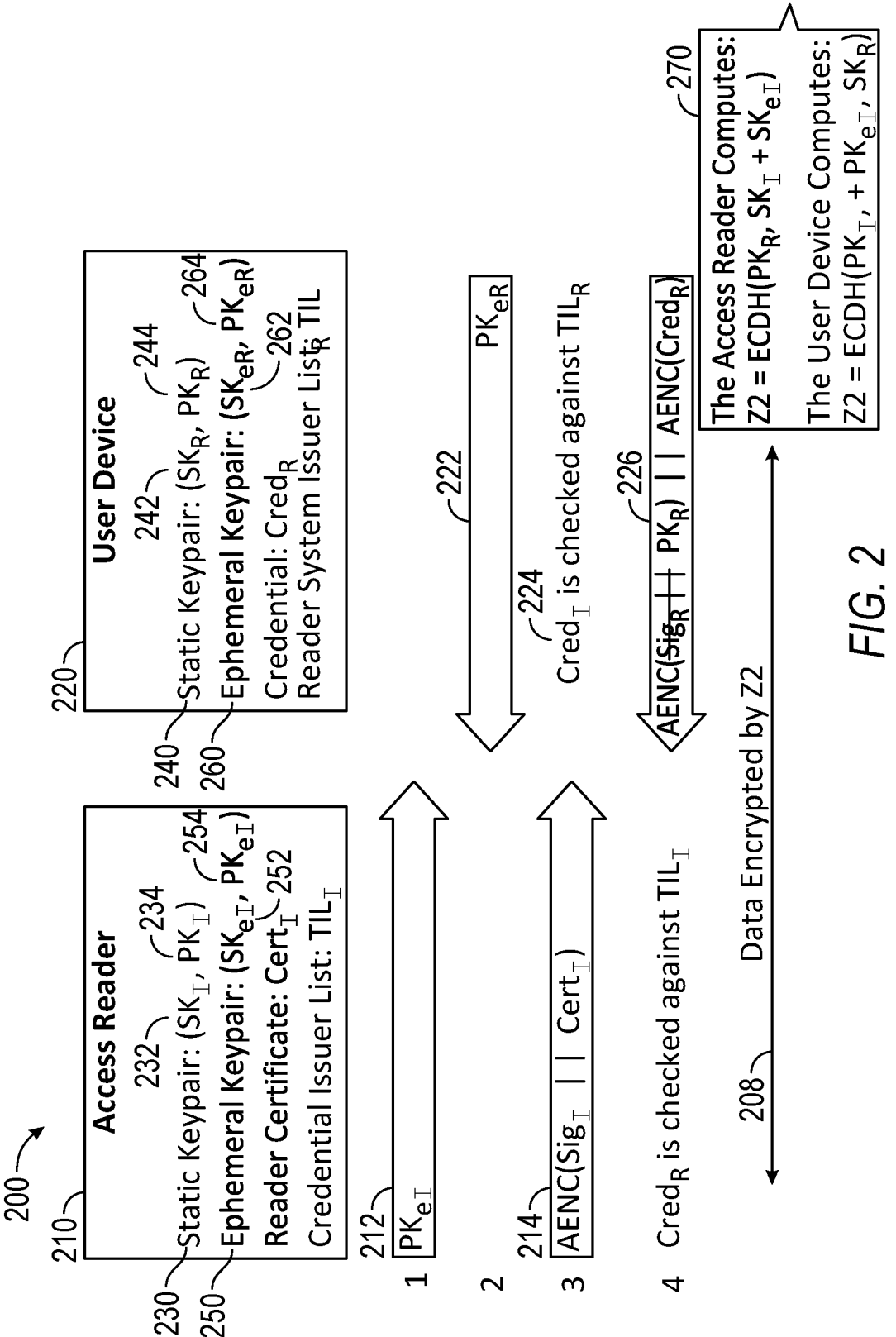
FIG. 2 illustrates an example diagram of a flow representing non-repudiation-free public key authentication, according to some examples.

FIG. 2 illustrates an example diagram 200 of a flow representing non-repudiation-free public key authentication, according to some examples. As shown in the diagram 200, an access reader 210 (e.g., the access control device 110) and a user device 220 (e.g., the client device 120) can establish a secure session for communication without exchanging signatures or with only one of the two devices generating and exchanging a signature. The access reader 210 can store a first static keypair 230 including a first static private key 232 and a first static public key 234. The user device 220 can store a second static keypair 240 including a first static private key 242 and a first static public key 244.

The access reader 210 can generate a first ephemeral key pair 250 including a public ephemeral key 254 and a private ephemeral key 252. The access reader 210 can transmit a message 212 to the user device 220 that includes the private ephemeral key 252. The user device 220 can process the message and generate a second ephemeral key pair 260 including a public ephemeral key 264 and a private ephemeral key 262. The user device 220 can transmit a message 222 to the access reader 210 that includes the public ephemeral key 264. In some examples, after the access reader 210 receives the message 222, the access reader 210 can generate a signature 214 using the public ephemeral key 264 of the user device 220 and/or one of the keys of the first static keypair 230 and/or the first ephemeral key pair 250. The signature 214 can be generated to include or represent a certificate of the access reader 210 and/or identifier of the access reader 210.

In some examples, the signature is generated by concatenating a signature value with a certificate value and applying an encryption function (e.g., authenticated encryption (AENC) function) to the data. The signature 214 is then sent from the access reader 210 to the user device 220. The user device 220 decrypts or retrieves the certificate value 2240 from the signature 214 and communicates with the server/controller 140 to verify the authenticity of the access reader 210. Once the authenticity is verified, the user device 220 generates a message 226 using AENC. The message 226 can include the first static public key 244 of the user device 220 (e.g., concatenated with AENC applied to a credential or certificate of the user device 220). The message 226 is sent to the access reader 210. At this point, the access reader 210 can decode or retrieve the credential and/or certificate from the message 226 and verify authenticity of the user device 220. Now, the access reader 210 and the user device 220 can each compute the shared session key 270 (e.g., Z2) independently using various combinations of the static private keys and the ephemeral keys.

For example, the access reader 210 can compute the shared session key by applying the Elliptic-curve Diffie-Hellman (ECDH) function to the sum of the first static private key 232 and the private ephemeral key 252 based on the first static public key 244. The user device 220 can compute the shared session key by applying the ECDH function to first static private key 242 based on the sum of the first static public key 234 and the public ephemeral key 254. After the shared session key 270 is computed, the access reader 210 and the user device 220 can resume communication by encrypting data using the shared session key. For example, the user device 220 can encrypt a credential for accessing a protected asset using the shared session key 270 and transmit a communication 280 to the access reader 210 including the encrypted credential.

FIG. 3 is a flowchart illustrating example process or method 300 of the access control system 100, according to some examples. The process 300 may be embodied in computer-readable instructions for execution by one or more processors such that the operations of the process or method 300 may be performed in part or in whole by the functional components of the system 100; accordingly, the process or method 300 is described below by way of example with reference thereto. However, in other examples, at least some of the operations of the process or method 300 may be deployed on various other hardware configurations. Some or all of the operations of process or method 300 can be in parallel, out of order, or entirely omitted.

At operation 301, the server/controller 140 (e.g., a PACS server), the access control device 110, and/or client device 120 establish, between a first device and a second device, a communication session based on a plurality of ephemeral keys, as discussed above.

At operation 302, the server/controller 140 and/or the access control device 110 compute a shared session key for the communication session as a function of a second public key of the second device and a sum of a first private key of the first device and a first ephemeral key of the plurality of ephemeral keys, as discussed above.

At operation 303, client device 120 computes the shared session key for the communication session as a function of a second private key of the second device and a sum of a first public key of the first device and a second ephemeral key of the plurality of ephemeral keys, as discussed above.

At operation 304, the server/controller 140 (e.g., a PACS server), the access control device 110, and/or client device 120 exchange one or more messages securely between the first device and the second device using the shared session key, as discussed above.

Figure 4:
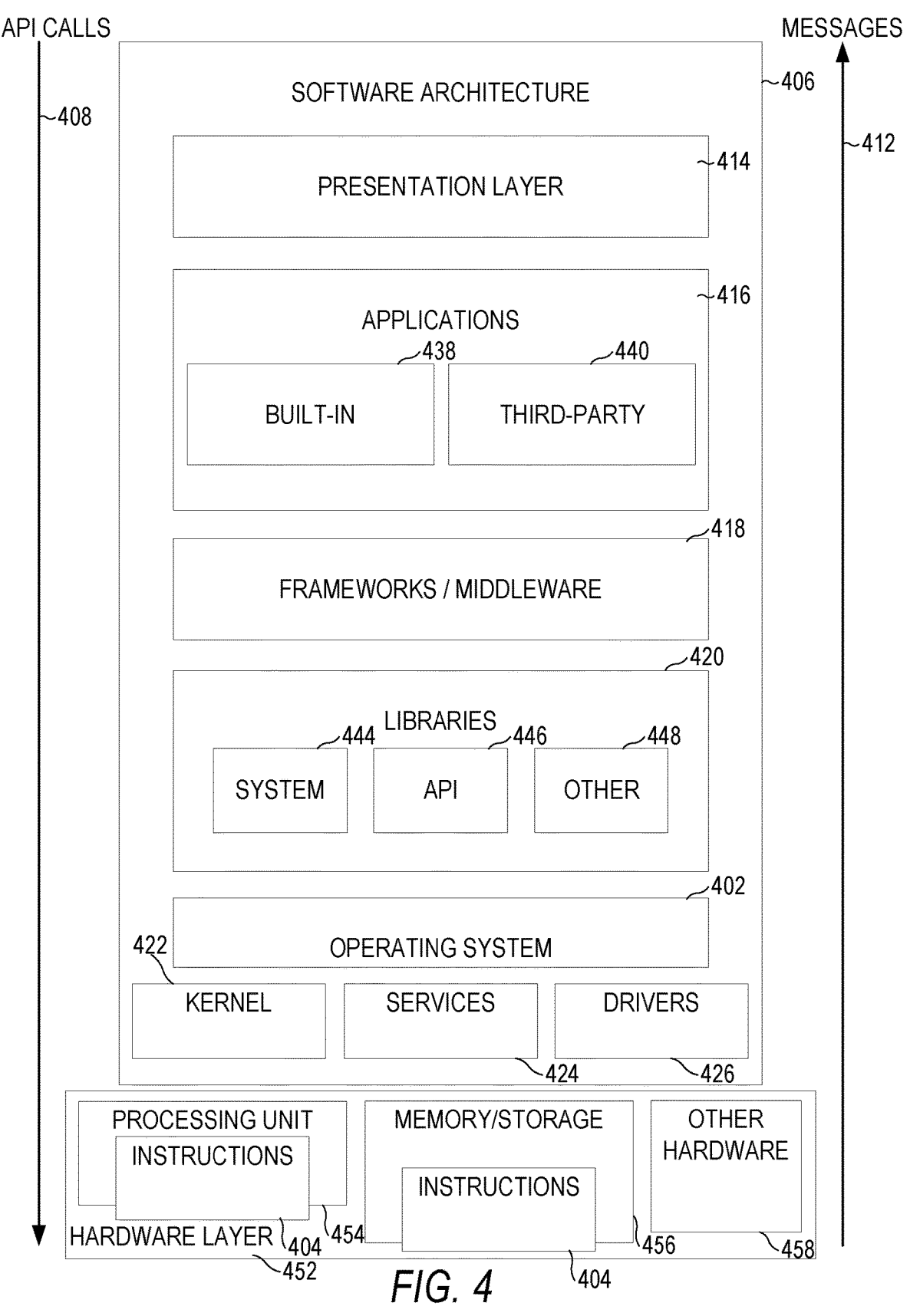
FIG. 4 is a block diagram illustrating an example software architecture, which may be used in conjunction with various hardware architectures herein described.

FIG. 4 is a block diagram illustrating an example software architecture 406, which may be used in conjunction with various hardware architectures herein described. FIG. 4 is a non-limiting example of a software architecture and it will be appreciated that many other architectures may be implemented to facilitate the functionality described herein. The software architecture 406 may execute on hardware such as machine 500 of FIG. 5 that includes, among other things, processors 504, memory 514, and input/output (I/O) components 518. A representative hardware layer 452 is illustrated and can represent, for example, the machine 500 of FIG. 5. The representative hardware layer 452 includes a processing unit 454 having associated executable instructions 404. Executable instructions 404 represent the executable instructions of the software architecture 406, including implementation of the methods, components, and so forth described herein. The hardware layer 452 also includes memory and/or storage devices memory/storage 456, which also have executable instructions 404. The hardware layer 452 may also comprise other hardware 458. The software architecture 406 may be deployed in any one or more of the components shown in FIG. 1.

In the example architecture of FIG. 4, the software architecture 406 may be conceptualized as a stack of layers where each layer provides particular functionality. For example, the software architecture 406 may include layers such as an operating system 402, libraries 420, frameworks/middleware 418, applications 416, and a presentation layer 414. Operationally, the applications 416 and/or other components within the layers may invoke API calls 408 through the software stack and receive messages 412 in response to the API calls 408. The layers illustrated are representative in nature and not all software architectures have all layers. For example, some mobile or special purpose operating systems may not provide a frameworks/middleware 418, while others may provide such a layer. Other software architectures may include additional or different layers.

The operating system 402 may manage hardware resources and provide common services. The operating system 402 may include, for example, a kernel 422, services 424, and drivers 426. The kernel 422 may act as an abstraction layer between the hardware and the other software layers. For example, the kernel 422 may be responsible for memory management, processor management (e.g., scheduling), component management, networking, security settings, and so on. The services 424 may provide other common services for the other software layers. The drivers 426 are responsible for controlling or interfacing with the underlying hardware. For instance, the drivers 426 include display drivers, camera drivers, BLE drivers, UWB drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 420 provide a common infrastructure that is used by the applications 416 and/or other components and/or layers. The libraries 420 provide functionality that allows other software components to perform tasks in an easier fashion than to interface directly with the underlying operating system 402 functionality (e.g., kernel 422, services 424 and/or drivers 426). The libraries 420 may include system libraries 444 (e.g., C standard library) that may provide functions such as memory allocation functions, string manipulation functions, mathematical functions, and the like. In addition, the libraries 420 may include API libraries 446 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional (2D) and three-dimensional (3D) in a graphic content on a display), database libraries (e.g., SQLite that may provide various relational database functions), web libraries (e.g., WebKit that may provide web browsing functionality), and the like. The libraries 420 may also include a wide variety of other libraries 448 to provide many other APIs to the applications 416 and other software components/devices.

The frameworks/middleware 418 (also sometimes referred to as middleware) provide a higher-level common infrastructure that may be used by the applications 416 and/or other software components/devices. For example, the frameworks/middleware 418 may provide various graphic user interface functions, high-level resource management, high-level location services, and so forth. The frameworks/middleware 418 may provide a broad spectrum of other APIs that may be utilized by the applications 416 and/or other software components/devices, some of which may be specific to a particular operating system 402 or platform.

The applications 416 include built-in applications 438 and/or third-party applications 440. Examples of representative built-in applications 438 may include, but are not limited to, a contacts application, a browser application, a book reader application, a location application, a media application, a messaging application, and/or a game application. Third-party applications 440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 440 may invoke the API calls 408 provided by the mobile operating system (such as operating system 402) to facilitate functionality described herein.

The applications 416 may use built-in operating system functions (e.g., kernel 422, services 424, and/or drivers 426), libraries 420, and frameworks/middleware 418 to create UIs to interact with users of the system. Alternatively, or additionally, in some systems, interactions with a user may occur through a presentation layer, such as presentation layer 414. In these systems, the application/component "logic" can be separated from the aspects of the application/component that interact with a user.

Figure 5:
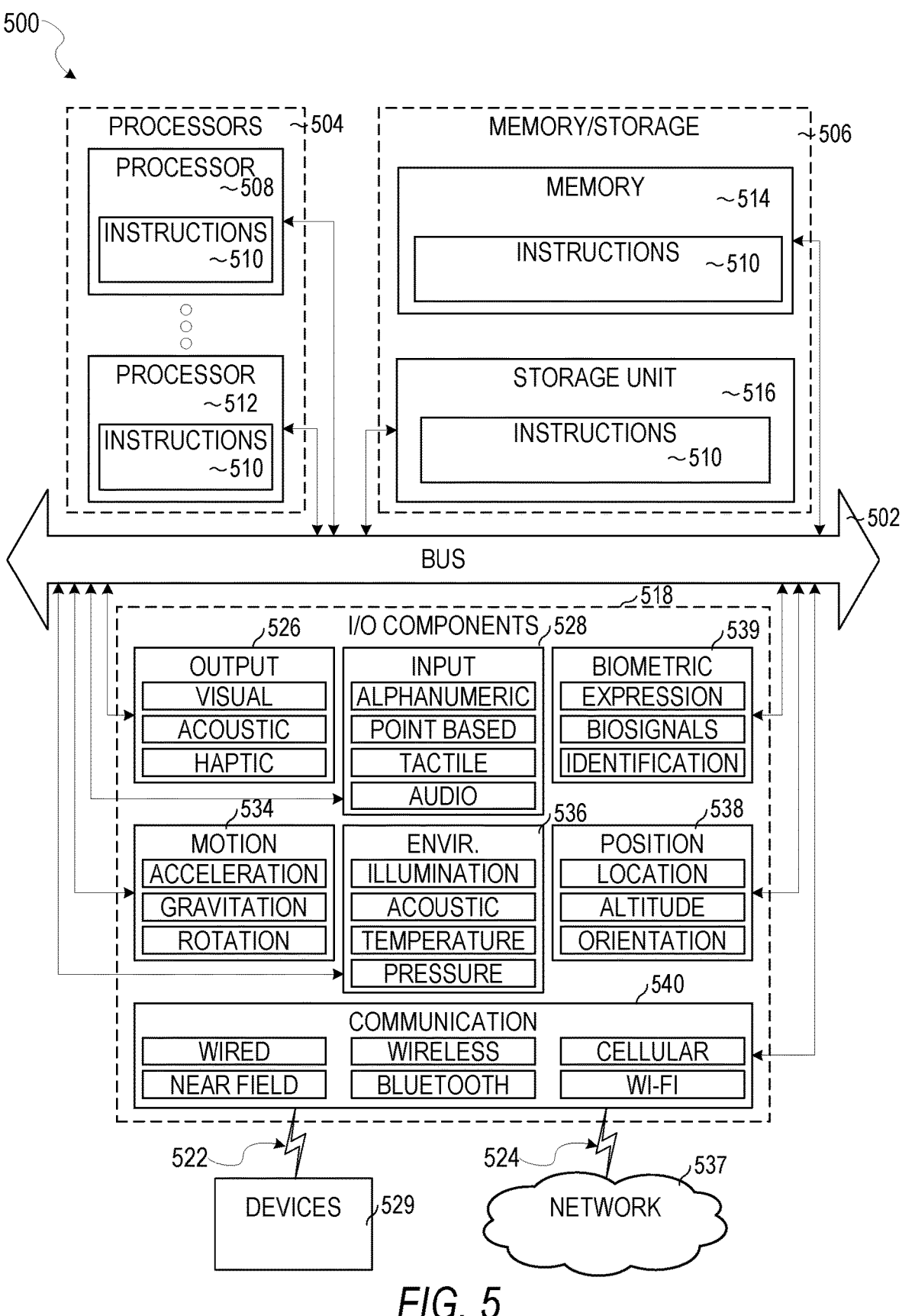
FIG. 5 is a block diagram illustrating components of a machine, according to some examples.

FIG. 5 is a block diagram illustrating components of a machine 500, according to some examples, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed.

As such, the instructions 510 may be used to implement devices or components described herein. The instructions 510 transform the general, non-programmed machine 500 into a particular machine 500, such as the client device 120, access control device 110, or server/controller 140, programmed to carry out the described and illustrated functions in the manner described. In alternative examples, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 510, sequentially or otherwise, that specify actions to be taken by machine 500. Further, while only a single machine 500 is illustrated, the term "machine" shall also be taken to include a collection of machines that individually or jointly execute the instructions 510 to perform any one or more of the methodologies discussed herein.

The machine 500 may include processors 504, memory/storage 506, and I/O components 518, which may be configured to communicate with each other such as via a bus 502. In an example, the processors 504 (e.g., a CPU, a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 508 and a processor 512 that may execute the instructions 510. The term "processor" is intended to include multi-core processors 504 that may comprise two or more independent processors (sometimes referred to as "cores") that may execute instructions contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory/storage 506 may include a memory 514, such as a main memory, or other memory storage, database 510, and a storage unit 516, both accessible to the processors 504 such as via the bus 502. The storage unit 516 and memory 514 store the instructions 510 embodying any one or more of the methodologies or functions described herein. The instructions 510 may also reside, completely or partially, within the memory 514, within the storage unit 516, within at least one of the processors 504 (e.g., within the processor's cache memory), or any suitable combination thereof, during execution thereof by the machine 500. Accordingly, the memory 514, the storage unit 516, and the memory of processors 504 are examples of machine-readable media.

The I/O components 518 may include a wide variety of components to receive input, provide output, produce output, transmit information, exchange information, capture measurements, and so on. The specific I/O components 518 that are included in a particular machine 500 will depend on the type of machine. For example, portable machines such as mobile phones will likely include a touch input device or other such input mechanisms, while a headless server machine will likely not include such a touch input device. It will be appreciated that the I/O components 518 may include many other components that are not shown in FIG. 5. The I/O components 518 are grouped according to functionality merely for simplifying the following discussion and the grouping is in no way limiting. In various examples, the I/O components 518 may include output components 526 and input components 528. The output components 526 may include visual components (e.g., a display such as a plasma display panel (PDP), a LED display, a LCD, a projector, or a cathode ray tube (CRT)), acoustic components (e.g., speakers), haptic components (e.g., a vibratory motor, resistance mechanisms), other signal generators, and so forth. The input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further examples, the I/O components 518 may include biometric components 539, motion components 534, environmental components 536, or position components 538 among a wide array of other components. For example, the biometric components 539 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 534 may include acceleration sensor components (e.g., accelerometer), gravitation sensor components, rotation sensor components (e.g., gyroscope), and so forth. The environmental components 536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518 may include communication components 540 operable to couple the machine 500 to a network 537 or devices 529 via coupling 524 and coupling 522, respectively. For example, the communication components 540 may include a network interface component or other suitable device to interface with the network 537. In further examples, communication components 540 may include wired communication components, wireless communication components, cellular communication components, NFC components, Bluetooth® components (e.g., Bluetooth® Low Energy), Wi-Fi® components, and other communication components to provide communication via other modalities. The devices 529 may be another machine or any of a wide variety of peripheral devices (e.g., a peripheral device coupled via a USB).

Moreover, the communication components 540 may detect identifiers or include components operable to detect identifiers. For example, the communication components 540 may include RFID tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via IP geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices or that communicates directly with such other devices or server systems. A client device may be, but is not limited to, a mobile phone, desktop computer, laptop, PDA, smart phone, tablet, ultrabook, netbook, laptop, multi-processor system, microprocessor-based or programmable consumer electronics, game console, STB, or any other communication device that a user may use to access a network.

"COMMUNICATIONS NETWORK" in this context refers to one or more portions of a network that may be an ad hoc network, an intranet, an extranet, a VPN, a LAN, a BLE network, a UWB network, a WLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, a network or a portion of a network may include a wireless or cellular network and the coupling may be a CDMA connection, a GSM connection, or other type of cellular or wireless coupling. In this example, the coupling may implement any of a variety of types of data transfer technology, such as 1xRTT, EVDO technology, GPRS technology, EDGE technology, 3GPP including 3G, 4G networks, UMTS, HSPA, WiMAX, LTE standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, RAM, ROM, buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

Changes and modifications may be made to the disclosed examples without departing from the scope of the present disclosure. These and other changes or modifications are intended to be included within the scope of the present disclosure, as expressed in the following claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separate example.

What is claimed is:

1. A method comprising:
establishing, between a first device and a second device, a communication session based on a plurality of ephemeral keys;
computing, by the first device, a shared session key for the communication session as a function of a second static public key of the second device and a sum of a first static private key of the first device and a first private ephemeral key of the plurality of ephemeral keys, the computing comprising multiplying the second static public key of the second device by the sum of the first static private key and the first private ephemeral key;
computing, by the second device, the shared session key for the communication session as a function of a second private key of the second device and a sum of a first public key of the first device and a second ephemeral key of the plurality of ephemeral keys; and
exchanging one or more messages securely between the first device and the second device using the shared session key.

2. The method of claim 1, wherein the first device comprises an access control reader; and
wherein the second device comprises a user device.

3. The method of claim 2, wherein the one or more messages comprise a credential for accessing a protected asset associated with the access control reader.

4. The method of claim 1, wherein establishing the communication session comprises performing Diffie-Hellman key exchange to exchange the first and second public keys.

5. The method of claim 1, further comprising:
generating, by the first device, a first ephemeral key pair of the plurality of ephemeral keys, the first ephemeral key pair comprising a first public ephemeral key and a first private ephemeral key; and
generating, by the second device, a second ephemeral key pair of the plurality of ephemeral keys, the second ephemeral key pair comprising a second public ephemeral key and a second private ephemeral key.

6. The method of claim 5, wherein the first ephemeral key comprises the first private ephemeral key; and
wherein the second ephemeral key comprises the first public ephemeral key.

7. The method of claim 1, wherein the first and second ephemeral keys correspond to a pair of private and public ephemeral keys of the first device.

8. The method of claim 1, further comprising:
generating a digital signature using the first and second public keys and the first private key.

9. The method of claim 8, wherein the digital signature is generated based on a certificate of the first device or an identifier of the first device, the second device authenticating the first device based on the digital signature.

10. The method of claim 1, further comprising:
generating an authentication message by the second device using the shared session key.

11. The method of claim 1, wherein the shared session key, computed by the first and second devices, is of a same value.

12. The method of claim 1, wherein the second device computes the shared session key by:
multiplying the second private key by the sum of the first public key and the second ephemeral key.

13. The method of claim 1, further comprising:
deriving a further shared session key based on one or more of the plurality of ephemeral keys and the first public key or the second public key.

14. The method of claim 13, wherein the second device generates an authentication message for transmission to the first device based on the further shared session key.

15. The method of claim 1, wherein the plurality of ephemeral keys are stored on a remote server.

16. The method of claim 3, the access control reader comprising a physical access control system (PACS) that searches a list of credentials stored in an authorization system to determine whether the credential matches one or more credentials from a list of authorized credentials for accessing the protected asset; comprising:
in response to determining that the credential matches an individual credential in the list of credentials, the access control reader performs an operation granting access by instructing an access control device to unlock a physical lock associated with the protected asset.

17. A system comprising:
one or more processors coupled to a memory comprising non-transitory computer instructions that, when executed by the one or more processors, cause the one or more processors to perform operations comprising:
establishing, between a first device and a second device, a communication session based on a plurality of ephemeral keys;
computing, by the first device, a shared session key for the communication session as a function of a second static public key of the second device and a sum of
a first static private key of the first device and a first
private ephemeral key of the plurality of ephemeral
keys, the computing comprising multiplying the sec-
ond static public key of the second device by sum of
the first static private key and the first private ephem-
eral key;

computing, by the second device, the shared session
key for the communication session as a function of
a second private key of the second device and a sum
of a first public key of the first device and a second
ephemeral key of the plurality of ephemeral keys;
and exchanging one or more messages securely between the
first device and the second device using the shared
session key.

18. A non-transitory computer readable medium compris-
ing non-transitory computer-readable instructions that, when
executed by one or more processors, configure the one or
more processors to perform operations comprising:

establishing, between a first device and a second device,
a communication session based on a plurality of
ephemeral keys;

computing, by the first device, a shared session key for the
communication session as a function of a second static
public key of the second device and a sum of a first
static private key of the first device and a first private
ephemeral key of the plurality of ephemeral keys, the computing comprising multiplying the second static
public key of the second device by the sum of the first
static private key and the first private ephemeral key;

computing, by the second device, the shared session key
for the communication session as a function of a second
private key of the second device and a sum of a first
public key of the first device and a second ephemeral
key of the plurality of ephemeral keys; and exchanging one or more messages securely between the
first device and the second device using the shared
session key.

19. The non-transitory computer readable medium of
claim 18, wherein the first device comprises an access
control reader; and wherein the second device comprises a user device.

20. The non-transitory computer readable medium of
claim 18, wherein the operations further comprise:

establishing the communication session without requiring
the second device to generate a digital signature for
authentication to avoid creating of non-repudiable
proof that a user associated with the second device has
accessed the first device, wherein the operations pro-
vide security communication between the first and
second devices without requiring generation of the
digital signatures through vector or scalar multiplica-
tion operations.

* * * * *